(12) United States Patent
Li et al.

(10) Patent No.: US 12,473,688 B2
(45) Date of Patent: Nov. 18, 2025

(54) CARBENE CO-GRAFTING MODIFIED FABRIC, PREPARATION AND APPLICATION THEREOF

(71) Applicant: SOOCHOW UNIVERSITY, Suzhou (CN)

(72) Inventors: Zhanxiong Li, Suzhou (CN); Cun Lv, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/035,743

(22) PCT Filed: Jul. 12, 2022

(86) PCT No.: PCT/CN2022/105220
§ 371 (c)(1),
(2) Date: May 6, 2023

(87) PCT Pub. No.: WO2023/155368
PCT Pub. Date: Aug. 24, 2023

(65) Prior Publication Data
US 2024/0344265 A1    Oct. 17, 2024

(30) Foreign Application Priority Data

Feb. 15, 2022    (CN) .......................... 202210138064.2

(51) Int. Cl.
*D06M 13/372*    (2006.01)
*D06M 13/133*    (2006.01)
*D06M 101/06*    (2006.01)

(52) U.S. Cl.
CPC ........ *D06M 13/372* (2013.01); *D06M 13/133* (2013.01); *D06M 2101/06* (2013.01); *D06M 2200/12* (2013.01)

(58) Field of Classification Search
CPC .......................... D06M 13/372; D06M 13/133
See application file for complete search history.

(56) References Cited

U.S. PATENT DOCUMENTS 4,309,453 A    1/1982    Reiner et al.

FOREIGN PATENT DOCUMENTS

| CN | 111472171 A | 7/2020 |
|----|-------------|--------|
| CN | 112048910 A | 12/2020 |

(Continued)

OTHER PUBLICATIONS

Machine translation for CN 112080937. (Year: 2020).*

(Continued)

*Primary Examiner* — Peter Y Choi
(74) *Attorney, Agent, or Firm* — SZDC Law PC

(57) ABSTRACT

A carbene co-grafted modified fabric, a preparation method therefor, and an application thereof. Diazotized cotton fabric is sequentially subjected to a reaction with tert-butyl diazoacetate and octyl diazoacetate to obtain the carbene co-grafted modified fabric; or diazotized cotton fabric is sequentially subjected to a reaction with phenyl diazoacetate and octyl diazoacetate to obtain the carbene co-grafted modified fabric. Taking phenyl diazoacetate and tert-butyl diazoacetate as monomers, co-grafting into a cotton fabric is respectively performed with octyl diazoacetate carbene, a surface structure having low surface energy and good roughened morphology is constructed on a fiber surface, and excellent water repellency is consequently provided.

5 Claims, 12 Drawing Sheets

(56) References Cited

FOREIGN PATENT DOCUMENTS

| | | | |
|---|---|---|---|
| CN | 112080937 | A | 12/2020 |
| CN | 112878053 | A | 6/2021 |
| CN | 114481608 | A | 5/2022 |

OTHER PUBLICATIONS

Wulong Li et al., "One-step spontaneous grafting via diazonium chemistry for the fabrication of robust bionic multifunctional superhydrophobic fabric" Surface & Coatings Technology 407 (2021) 126802 (Jan. 4, 2021).

* cited by examiner (a)

(b)

CARBENE CO-GRAFTING MODIFIED FABRIC, PREPARATION AND APPLICATION THEREOF

This application is the National Stage Application of PCT/CN2022/105220, filed on Jul. 12, 2022, which claims priority to Chinese Patent Application No. 202210138064.2, filed on Feb. 15, 2022, which is incorporated by reference for all purposes as if fully set forth herein.

TECHNICAL FIELD

The present invention belongs to hydrophobic modification of fabrics, and specifically relates to a carbene cografted modified fabric and its preparation method and application.

BACKGROUND OF INVENTION

More and more researchers have focused on the development and research of functional textiles, and the hot fields include superhydrophobic finishing technology for textiles. Water droplets can roll off the surface of superhydrophobic fabrics and take away dirt, avoiding contamination on the surface of the fabrics and giving them self-cleaning properties. Based on this, special functional textiles have been developed for application in fields such as oil resistance, corrosion resistance, anti-fogging, anti-biological adhesion, and anti-ice and snow adhesion. These materials can be used for special uniforms, anti-ice and snow protective layers, stain-resistant self-cleaning textiles, and medical protective materials. In recent years, constructing polymer structures connected by covalent bonds through covalent on-surface polymerization has become a hot research topic in surface molecular science. Thanks to the rapid development of scanning probe microscopy technology, researchers have gradually begun to explore the process of covalent on-surface polymerization at the atomic level. The covalent on-surface polymerization belongs to heterogeneous reactions. Compared with homogeneous reactions in solution, although the reactants in homogeneous reactions are more evenly dispersed, the interface of the phase boundary brings unique advantages due to the two-dimensional constraints of the surface in heterogeneous processes, such as the utilization of catalytic activity of solid surface, anisotropy and chirality of polymers, template effects, and convenient separation and purification post-processing, so the polymers formed by the covalent on-surface polymerization often have unique structures and properties. In the water repellency treatment of fabrics, the long-chain perfluoroalkyl (C≥8) polymers are one of the most ideal low surface energy polymeric materials. This type of compound has high stability, but it makes itself difficult to degrade through conventional degradation methods such as photodegradation, chemical degradation, and microbial degradation on the contrary, which contradicts the growing demand for green and pollution-free environment in the society.

TECHNICAL PROBLEMS

The fabric grafted with diazoacetate carbene shows good hydrophobicity, but due to the softness and film-forming properties of the polymer, the polymer roughness morphology generated by grafting modification on the fiber surface is not ideal. The present invention synthesizes tert-butyl diazoacetate and phenyl diazoacetate, and uses them to form particle and spherical roughness morphologies through carbene polymerization on the fiber surface. Long carbon chain monomers are carbene cografted with phenyl monomers or tert-butyl monomers to obtain fabrics with good hydrophobicity, especially since the present invention does not use fluorine-containing reagents.

TECHNICAL SOLUTION

A carbene cografted modified fabric, and the carbene cografted modified fabric is obtained by sequentially reacting diazotized cotton fabric with tert-butyl diazoacetate and octyl diazoacetate; Alternatively, the carbene cografted modified fabric is obtained by sequentially reacting diazotized cotton fabric with phenyl diazoacetate and octyl diazoacetate.

The present invention disclosed the application of tert-butyl diazoacetate/octyl diazoacetate and phenyl diazoacetate/octyl diazoacetate in the preparation of carbene cografted hydrophobic fabrics.

The present invention disclosed the application of the above-mentioned carbene cografted modified fabrics in the preparation of hydrophobic flexible materials; the fabrics of the present invention are natural fiber fabrics, chemical fiber fabric, or a blend thereof, such as cotton fabric.

In the present invention, the fabric was sequentially soaked in alkaline solution and acid solution to obtain a pre-treated fabric; then, the pre-treated fabric was reacted with bromoacetyl bromide to obtain the treated fabric; the pre-treated was reacted with 1,2-bis (p-Toluenesulfonyl) hydrazine to obtain the diazotized fabric; preferably, the alkaline solution was sodium hydroxide aqueous solution, and the acid solution was glacial acetic acid aqueous solution; when the pre-treatment fabric was reacted with bromoacetyl bromide, sodium bicarbonate was used as an acid binding agent, and the reaction was carried out at $-5°$ C. to $25°$ C. for 1-24 hours; the reaction between the pre-treated fabric and 1,2-bis (p-Toluenesulfonyl) hydrazine was carried out in the presence of DBU, and the reaction was carried out at 0-25° C. for 1-24 hours.

In the present invention, the molar ratio of tert-butyl diazoacetate to octyl diazoacetate was (4-40):1, preferably (9-30):1, most preferably (15-20):1; the molar ratio of phenyl diazoacetate to octyl diazoacetate was (2-30):1, preferably (5-25):1, and most preferably (10-20):1.

In the present invention, the diazotized cotton fabric was first reacted with tert-butyl diazoacetate at 0° C., 10° C., and 20° C. for 1 hour respectively, and then the octyl diazoacetate was added for reaction for 20-30 hours at 30° C.; alternatively, the diazotized cotton fabric was reacted with phenyl diazoacetate at 0° C., 10° C., and 20° C. for 1 hour respectively, and then the octyl diazoacetate was added for reaction for 20-30 hours at 30° C.

In the present invention, the reaction was carried out under nitrogen gas, in a solvent, in the presence of palladium catalyst and reducing agent. Preferably, the solvent was tetrahydrofuran, the palladium catalyst was $(\pi\text{-allylPdCl})_2$, and the reducing agent was $NaBPh_4$.

In the present invention, the molar ratio of ester monomer to diazotized cotton fabric surface hydroxyl was 5-40:1, preferably 10-30:1, and further preferably 20-30:1. The ester monomer was tert-butyl diazoacetate and octyl diazoacetate; or phenyl diazoacetate and octyl diazoacetate.

The present invention used tert-butyl bromoacetate and phenyl bromoacetate to react with 1,2-bis (p-Toluenesulfonyl) hydrazine respectively to synthesize tert-butyl diazoacetate and phenyl diazoacetate. Diazoacetic acid was used as a monomer to perform carbene polymerization grafting on the surface of the fabric, wherein the cubic crystals were generated on the tert-butyl diazoacetate carbene grafted modified fiber surface, while the spherical crystal morphology was generated on the fiber surface of the phenyl diazoacetate carbene grafted fabric, confirming that the two monomers used for fiber carbene polymerization grafting modification could produce roughness morphologies.

Tetrahydrofuran was used as the solvent and ($\pi$-allylPdCl)$_2$ and NaBPh$_4$ were used as catalysts, the tert-butyl diazoacetate and octyl diazoacetate were cografted onto the surface of the fabric in molar ratios of 8:2, 9:1, 19:1, and 39:1, respectively. Through SEM, AFM and other tests, it was found that when the ratio of tert-butyl diazoacetate to octyl diazoacetate was 8:2 (molar ratio), the fiber surface was covered by a membranous polymer, and when the amount of the tert-butyl diazoacetate was gradually increased, the membranous polymer decreased, and the granular structure on the fiber surface became prominent, ultimately forming a complete wrapping of the membrane structure on the particle structure; correspondingly, the water contact angle of the treated fabric increased from 110.2±1.2° to 143.2±1.8°, with the latter having good hydrophobicity.

The phenyl diazoacetate and octyl diazoacetate were used as carbene cografting monomers and they were used for cografting modification of common fabrics in molar ratios of 7:3, 17:3, and 19:1, respectively. Through SEM and other tests, it was observed that the fiber surface was covered by a membranous polymer when the ratio of phenyl diazoacetate to octyl diazoacetate (7:3, mol/mol) was used. More phenyl diazoacetate was used to generate polymer crystal particles, which resulted in the formation of membrane encapsulated microspheres and membranous structures with different roughness morphologies of well wrapped microspheres on the fiber surface. The contact angle test was conducted on the modified fabric, and the roughness modified fabric with membrane wrapping microsphere morphology achieved a water contact angle of 151.2±0.8°, which showed super-hydrophobicity and good self-cleaning performance. This was an excellent result without the involvement of fluorine reagents.

EXAMPLE OF THE PRESENT INVENTION

Figure 1:
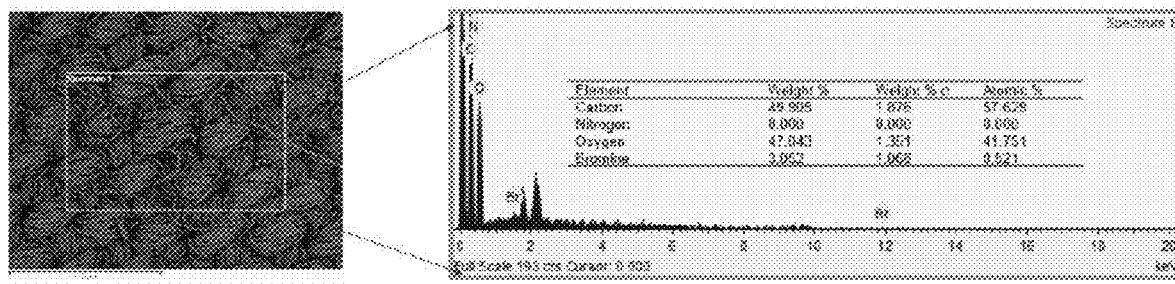
FIG. 1 shows the SEM-EDS image of the fiber surface: (a) Cotton-Br and (b) Cotton=N$_2$
Figure 1:
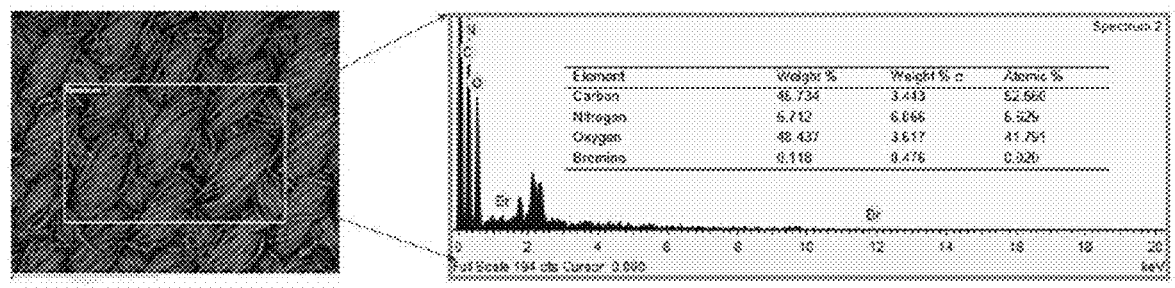

Cotton fabric was commercially available, and pyridine and 1-butanol were purchased from J&K Chemical Ltd., and p-Toluenesulfonyl hydrazine, p-toluenesulfonyl chloride, sodium tetraphenylborate, allylpalladium (II) chloride dimer were purchased from Shanghai Aladdin Bio-Chem Technology Co., LTD, and sodium chloride, sodium bicarbonate, dichloromethane (high-purity), anhydrous ethanol, and DBU were purchased from Sinopharm Chemical Reagent Co., Ltd., anhydrous sodium sulfate, tetrahydrofuran (high-purity), anhydrous ether, and anhydrous methanol were purchased from Chinasun Specialty Products Co., Ltd., and distilled water was made in the laboratory, and tert-butyl bromoacetate and phenyl bromoacetate were purchased from J&K Chemical Ltd. Unless otherwise specified, all reagents were of analytical grade.

Fourier Transform Infrared (FTIR)

KBr (or a mixture of KBr and solid samples) was ground into powder in a mortar and baked under a heating lamp until dry. An appropriate amount of KBr powder was weighed and pressed for 10 seconds under a pressure of 1 ton. The liquid sample was dripped on the KBr tablet through a capillary tube and placed inside an infrared spectrometer for testing.

H Nuclear Magnetic Resonance ($^1$H-NMR) Analysis

A small amount of the sample to be tested was taken and dissolved in chloroform-d (CDCl$_3$) or dimethyl sulfoxide-d6 (DMSO), and tested using an INOVA-400 nuclear magnetic resonance spectrometer with tetramethylsilane (TMS) as the internal standard.

Attenuated Total Reflectance (ATR) Test

The fabric to be tested was placed in an oven and dried at low temperature. After removal, it was placed on the test bench of the Nicolet iS5 infrared spectrometer. The test hole was covered and pressed tightly. The instrument resolution was set to 4 cm$^{-1}$, the scanning range was 4000-500 cm$^{-1}$, and it was scanned 12 times.

Field Emission Scanning Electron Microscope (SEM)

A square fabric with a side length of 5 mm was taken and stuck onto the electron microscope table with conductive adhesive. The vacuum pumping and metal spraying were carried out 6 times, and S4800 field emission scanning electron microscope was used to test the microstructure of the fiber surface.

Water Contact Angle (WCA) Test

The fabric to be tested was fixed flat on a microscope slide and placed on the sample table of OCA40 droplet wettability tester with the camera aligned. The deionized water was used as the test droplet, with a volume of 3 μL. The angle was calculated through instrument software, and each sample was tested 5 times, taking the average value and calculating the error.

Atomic Force Microscopy (AFM) Observation

The fiber surface morphology and three-dimensional structure of the fabric to be tested were observed using a Nanoscope V-type atomic force microscope. A sample with a diameter of approximately 1 cm was fixed flat on a matching iron plate, and the surface roughness was calculated using an instrument. The scanning range was set to 2 μm×2 μm.

Thermogravimetric Analysis (TGA)

The fabric to be tested was cut into powder form, and about 5 mg of the sample was taken and placed in a crucible. Then it was placed in a Diamond 5700 thermogravimetric analyzer, and the test gas was set to air, with a temperature range of 30° C.-600° C. and a heating rate of 20° C./min.

Determination of Fabric Permeability

According to the standard GB/T 5453-1997 "Determination of Permeability of Fabrics to Air", a test sample with an area of 20 cm² was placed on the test table of a fully automatic permeability meter, the test pressure difference was set to 100 pa, and the average of five tests for each sample was taken.

Breaking Strength of Fabric

The fabric to be tested was clamped on the GP-6114S-300K universal material testing machine, the force sensing range was set to 1000N, the stretching speed was set to 100 mm/min, the clamping length was 50 mm, the fabric width was 45 mm, and 5 tests were made for each sample in the warp and weft directions and the average value was taken.

Synthesis Example: Synthesis of 1,2-bis (p-Toluenesulfonyl) hydrazine (TsNHNHTs)

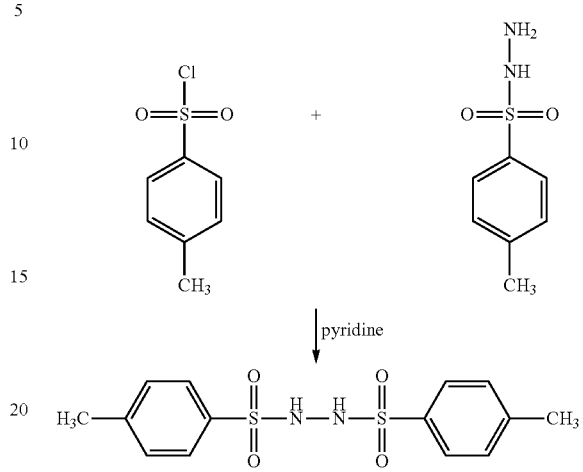

Under the nitrogen protection, 18.64 g (100.00 mmol) of p-Toluenesulfonyl hydrazine and 28.60 g (150.00 mmol) of p-toluenesulfochloride were added to a 1000 ml three-necked flask. 120 ml of dichloromethane (dehydrated) was used as the solvent, and 11.96 g (150.00 mmol) of pyridine was dropped dropwise under nitrogen gas protection. After stirring at room temperature for 3 hours, 300 ml of anhydrous ether was added to make the solution turbid. After cooling to 0° C., 200 ml of deionized water was added and then it was filtered to obtain a light-yellow floccule. Then it continued to be filtered with 150 ml of anhydrous ether to obtain a white solid, which was placed in an oven and dried at 30° C. The white solid after drying was dissolved in 400 ml of methanol and heated to boiling until the solid was completely dissolved, then it was cooled to room temperature for crystallization. The 24 g white crystallized product was finally obtained with a yield of: 70.0%. Product FT-IR (KBr, cm$^{-1}$): 3229, 3205 (N—H); 3065, 2942 (Ph-H); 1512 (—CH$_3$); 1607, (C—C); 1345, 1210, 1188 (Ph-SO$_2$—N); 1043 (S—N). $^1$H NMR (400 MHz, DMSO): 1.47 (—CH$_3$); 6.32 (Ph-H); 6.93 (Ph-H); 8.69 (N—H) ppm.

Synthesis of Phenyl Diazoacetate (PDA, B') and Tert-Butyl Diazoacetate (TBDA, A')

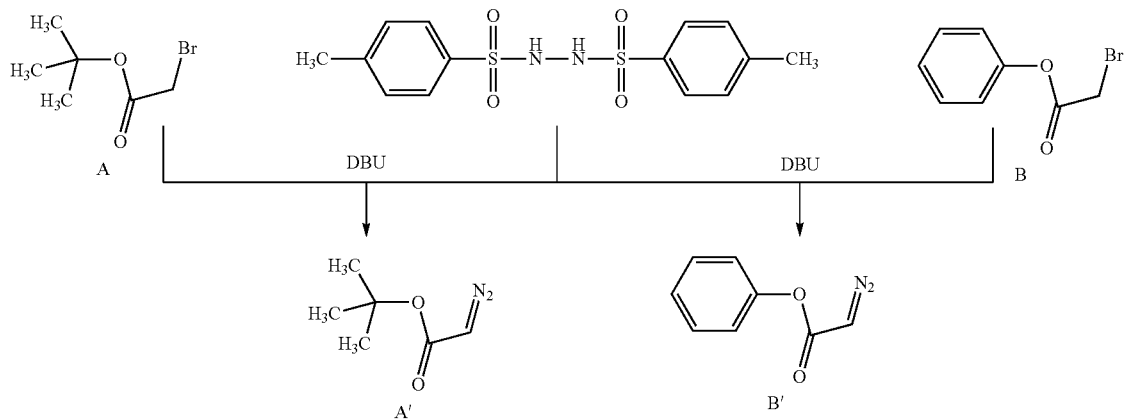

0.98 g (5 mmol) of tert-butyl bromoacetate was dissolved in 100 ml of dehydrated tetrahydrofuran, 3.41 g (10 mmol) of N, N'-toluenesulfonyl hydrazine was added, and it was stirred in a three-necked flask at −5° C. until it was dissolved. 3.85 ml DBU was diluted in 5 ml of dehydrated tetrahydrofuran and added dropwise into a three-necked flask with an injector under nitrogen conditions. The reaction solution in the flask quickly turned brown. After it was heated to 25° C. and reacted for 24 hours, 40 ml of deionized water was added for dilution. In a 250 ml separating funnel, it was extracted three times with dichloromethane, and the anhydrous sodium sulfate was added in organic phase to obtain the crude product after suction filtration and rotary evaporation. Then the purification was performed using silica gel chromatography (ethyl acetate:n-hexane=1:5, v/v) to obtain 0.50 g of a dark brown oily product with a yield of 68.3%. Product FT-IR (KBr, cm$^{-1}$): 3181 (C—H); 2002 (C=N$_2$); 1731 (C=O); 1417, 1385, 1216 (—CH$_3$); 1595, (C—C); 1258 (CO—O); 1150 (O—C—C). $^1$H NMR (400 MHz, CDCl$_3$): 1.48 (—CH$_3$); 4.63 (H—C=N$_2$) ppm. Through the infrared spectroscopy test, it could be observed that compared to the reactant of tert-butyl bromoacetate, the phenyl diazoacetate exhibited a unique diazo absorption peak at 2110 cm$^{-1}$. In the hydrogen nuclear magnetic resonance spectrum, the bromide substituted methyl peak disappeared at 3.75 ppm after diazotization of tert-butyl bromoacetate, and a new diazo peak appeared at 4.63 ppm, confirming the product of phenyl diazoacetate was successfully obtained after diazotization of tert-butyl bromoacetate.

2.16 g (10.0 mmol) of phenyl bromoacetate was diluted in 40 ml of dehydrated tetrahydrofuran, and stirred until it was completely dissolved, and the solution was added into a conical flask. Then 6.82 g (20.0 mmol) of 1,2-bis (p-toluenesulfonyl) hydrazine was added, the nitrogen gas was let in, the air in the conical flask was removed, and it was cooled to −5° C. Then 7.61 g of DBU (50.0 mmol) diluted in 10 ml of dehydrated tetrahydrofuran was added dropwise into the conical flask through an injector within 3 minutes, after that it was shaken and the temperature was raised to and kept at 5° C. for 3 hours. After the reaction was completed, it was diluted with deionized water and the solution in the conical flask turned from yellow to dark brown. The solution was transferred to a separating funnel, and 500 ml of dichloromethane was added for three extractions. The organic phase was dried with anhydrous sodium sulfate, filtered and evaporated to obtain a concentrated crude product. Then, ethyl acetate was used as the eluent, and separated and purified by silica gel column chromatography obtain 1.1 g of the reddish-brown oily product with a yield of 67%. Product FT-IR (KBr, cm$^{-1}$): 3128 (C—H); 2089 (C=N$_2$); 1695 (C=O); 1604 (C—C); 1313 (CO—O); 718, 693 (C—H). $^1$H NMR (400 MHz, CDCl$_3$): 7.11 (Ph-H); 7.25 (Ph-H); 7.37 (Ph-H); 4.79 (H—C=N$_2$) ppm. Through the IR characterization of the raw material and target product, the characteristic peaks of the reactant of phenyl bromoacetate and the target product of phenyl diazoacetate were similar, but the phenyl bromoacetate had a unique diazo absorption peak at 2121 cm$^{-1}$. At the same time, a new diazo peak appeared at 4.79 ppm in the $^1$H-NMR spectrum, confirming the product of phenyl diazoacetate was successfully obtained after diazotization of phenyl bromoacetate.

The structure of grafting sites on the fabric surface: 100 g of sodium hydroxide and 500 ml of deionized water were added to a 1000 ml beaker, and stirred until it was dissolved. The untreated cotton fabric was immersed in the solution for 1 hour, and then it was taken out and washed with deionized water five times, then the alkalized cotton fabric was put in and soaked in 5% acetic acid for 30 minutes, and washed with deionized water five times to obtain the pretreated fabric to be dried at room temperature for standby.

The pretreated fabric (0.415 g) was soaked in anhydrous tetrahydrofuran, and subjected to the ultrasonic cleaning for 30 minutes, and dried at room temperature for standby. The pretreated fabric was put into a conical flask containing 100 ml of anhydrous tetrahydrofuran. After the fabric was completely soaked, 0.83 g of sodium bicarbonate was used as an acid binding agent. The nitrogen gas was let in to empty the air in the flask to cool down to −5° C. After the temperature became stable, 3.25 g of bromoacetyl bromide was dissolved in 5 ml of dehydrated tetrahydrofuran, and then it was added to a conical flask through an injector for 1-hour reaction. Then the temperature was raised to 10° C. for 1-hour reaction. After that, the temperature was raised to 25° C. for 24-hour reaction. The fabric was taken out and washed with tetrahydrofuran and dried to obtain the treated cotton fabric. The SEM-EDS image of the fiber surface is shown in FIG. 1a.

The treated cotton fabric was put into a conical flask, 50 ml of anhydrous tetrahydrofuran and 2.71 g 1,2-bis (p-Toluenesulfonyl) hydrazine were added, and the nitrogen gas was let in to empty the air in the flask, then it was transferred to a low-temperature reactor to cool to −10° C. DBU dissolved in 10 ml anhydrous tetrahydrofuran was added dropwise into a conical flask through an injector. The flask was shaken until 1,2-bis (p-Toluenesulfonyl) hydrazine was completely dissolved, and the solution gradually turned yellow. Then the temperature was raised to 0° C. for 1-hour reaction. After that, the temperature was raised to 25° C. for 24-hour reaction. The fabric was taken out and washed with tetrahydrofuran and dried to obtain the diazotized cotton fabric. The SEM-EDS image of the fiber surface is shown in FIG. 1b.

Note: The molecular formula of cellulose is (C$_6$H$_{12}$O$_{12}$)$_n$, and when M g of alkalized cotton fabric is taken, the amount of hydroxyl groups on its surface is approximately M/162× 10$^3$ mmol.

Figure 2:
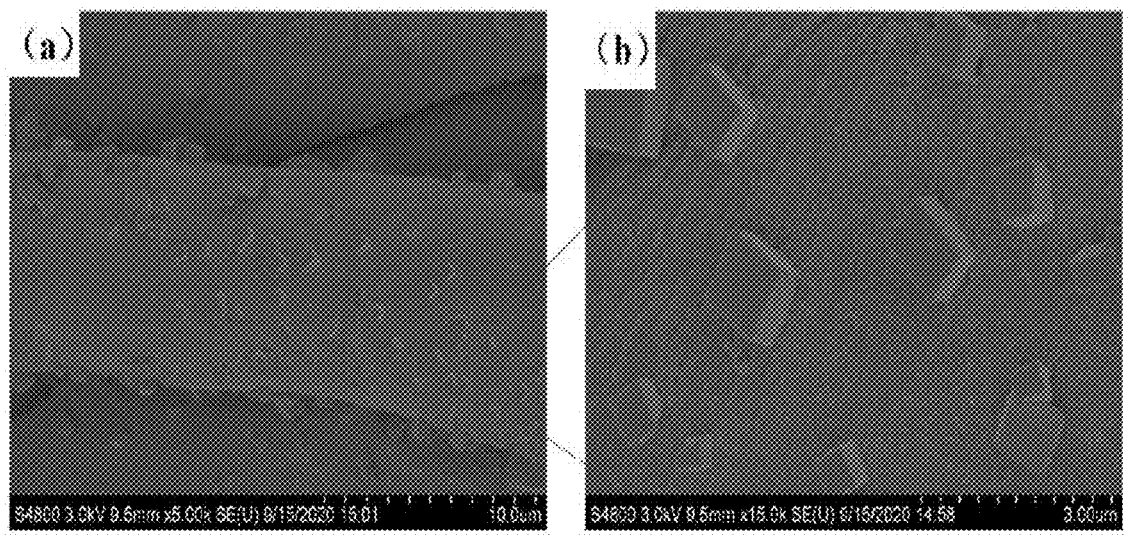
FIG. 2 shows the scanning electron microscope image of P(DBTA)-cotton: (a)×5000; (b)×15000

Control: Grafting modification of cotton fabric with tert-butyl diazoacetate and phenyl diazoacetate individually: 60 mmol of tert-butyl diazoacetate monomer was diluted in 100 ml of dehydrated tetrahydrofuran solution, and 18.21 mg (0.05 mmol) (π-allylPdCl)$_2$ was added to the solution and stirred well. Then the solution was transferred to a conical flask and 0.26 g of diazotized cotton fabric (containing about 2 mmol of hydroxyl) was added. After that, it was cooled down to −10° C. in a low-temperature reactor and a nitrogen gas atmosphere, and 32.5 mg (0.09 mmol) of NaBPh$_4$ was added. Next, it was heated up to 0° C., 10° C., 20° C. for 1-hour reaction respectively. Finally, it was transferred to a shaking water bath at 30° C. for 24 hours. After the reaction was completed, the fabric was taken out and washed with deionized water and ethanol respectively, and dried at 50° C. The fiber surface morphology of tert-butyl diazoacetate carbene grafted cotton was detected by SEM (see FIG. 2). After modification, cubic polymer crystals with excellent tridimensional regularity appeared on the surface of the fibers, with slight differences in crystal particle size. The crystal surface was smooth and flat, and all six sides were regular quadrilaterals. Unlike the sphaerocrystals and lamellar crystals often generated by conventional polymers, the carbene polymer crystallization generated regular cubes, giving the carbene polymer chains strong rigidity.

Figure 3:
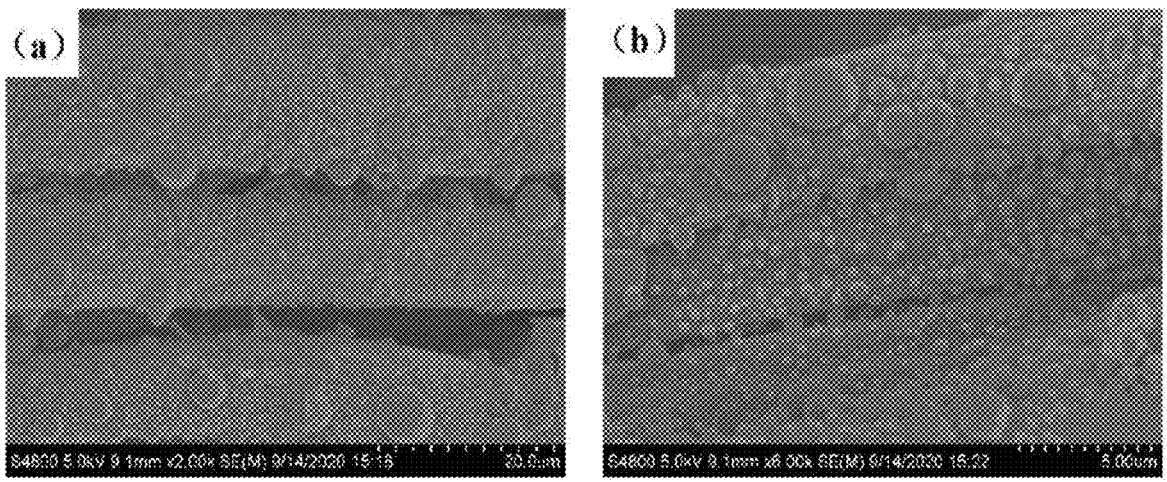
FIG. 3 shows the scanning electron microscope image of P(PDA)-cotton: (a)×2000; (b)×6000

10 mmol of phenyl diazoacetate was diluted in 100 ml of dehydrated tetrahydrofuran solution, and 18.21 mg (0.05 mmol) (π-allylPdCl)$_2$ was added to the solution and stirred well. Then the solution was transferred to a conical flask and 0.26 g of diazotized cotton fabric (containing about 2 mmol of hydroxyl) was added. After that, it was cooled down to −10° C. in a low-temperature reactor and a nitrogen gas atmosphere, and 32.5 mg (0.09 mmol) of NaBPh$_4$ was added. Next, it was heated up to 0° C., 10° C., 20° C. for 1-hour reaction respectively. Finally, it was transferred to a shaking water bath at 30° C. to react for 24 hours. After the reaction was completed, the fabric was taken out and washed with deionized water and ethanol respectively, and dried at 50° C. The SEM image of the phenyl diazoacetate carbene grafted modified fiber is shown in FIG. 3, indicating that the particles generated on the surface of the modified fiber are spherical and uniformly dispersed. Upon magnification observation, it was found that some spherical crystal particles had a size up to micrometers, with a smooth surface and no aggregation between particles.

Example 1

Tert-butyl diazoacetate/octyl diazoacetate carbene cografting: (1) 12.00 mmol of octyl diazoacetate was taken and dissolved in 50 ml of dehydrated tetrahydrofuran, 4.28 mg (π-allylPdCl)$_2$ was added in a nitrogen atmosphere at −10° C., and it was heated up to 20° C. to be used in the step (2); (2) 48.00 mmol tert-butyl diazoacetate was added to 150 ml of dehydrated tetrahydrofuran, and it was shaken evenly until dissolved, then it was transferred to a conical flask, and 0.26 g of diazotized cotton fabric was added to the conical flask, and the nitrogen gas was let in until the air was emptied; 18.30 mg (0.051 mmol) (π-allylPdCl)$_2$ was diluted in 10 ml of dehydrated tetrahydrofuran and added into a conical flask through an injector. After shaking, the solution gradually turned dark purple. The conical flask was transferred into a low-temperature reactor and cooled down to −10° C. After the temperature became stable, NaBPh$_4$ (0.18 mmol) that was previously dissolved in 10 ml of dehydrated tetrahydrofuran was added dropwise into the conical flask (3 minutes), and bubbles gradually formed inside the conical flask; the reaction temperature was raised to 0° C., 10° C., and 20° C. to react for 1 hour respectively; the solution from step (1) was added through an injector and mixed evenly, then it was transferred to a shaking water bath, and heated up to 30° C. to react for 24 hours. After the reaction was completed, the fabric was taken out and washed with ethanol and deionized water, and dried in an oven at 50° C.

Figure 4:
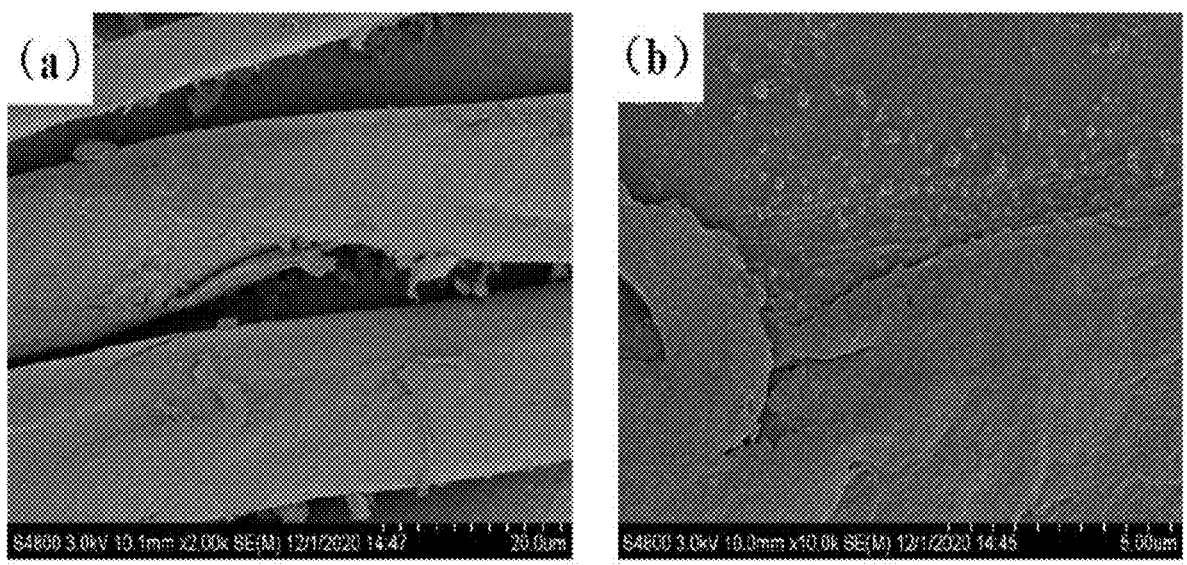
FIG. 4 shows the SEM image of the Copolymer-cotton surface with tert-butyl diazoacetate/octyl diazoacetate 8:2: (a)×2000; (b)×10000

In the above process, the ratio of tert-butyl diazoacetate monomer to octyl diazoacetate was 8:2 (mol). FIG. 4 shows the SEM image of the fabric surface after carbene cografting with the ratio of tert-butyl diazoacetate and octyl diazoacetate as 4:1. From (a), it can be seen that the surface of the treated fibers was covered by a membranous polymer, accompanied by a small amount of membrane falling off. After local magnification, it can be seen in Figure (b) that particulate crystal structures appeared in the bottom layer covered by the membrane.

Figure 5:
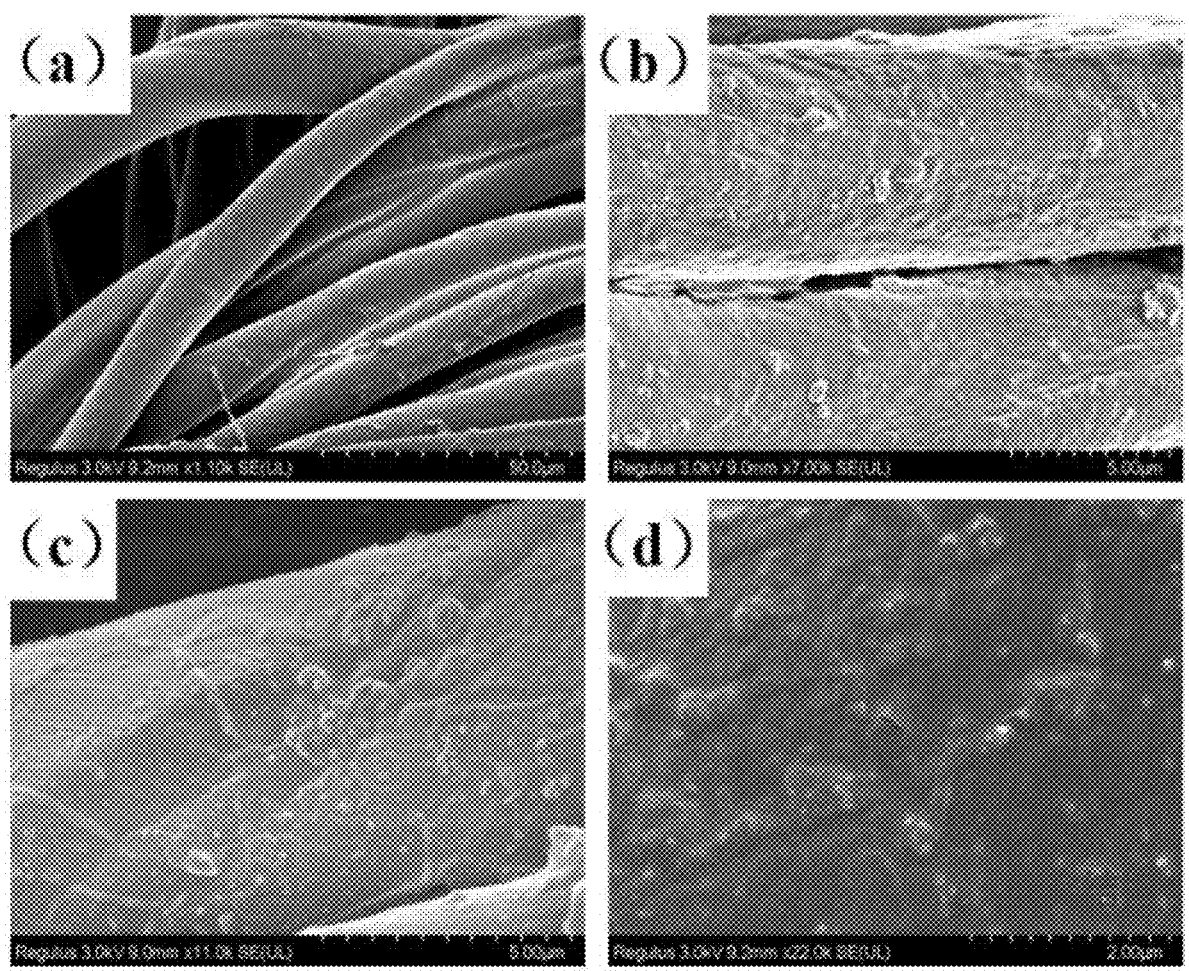
FIG. 5 shows the SEM image of the Copolymer-cotton surface with tert-butyl diazoacetate/octyl diazoacetate 9:1: (a)×1100; (b)×7000; (c)×11000; (d)×22000

Under the same other process conditions, the dosage of tert-butyl diazoacetate monomer and octyl diazoacetate was changed to: (1) 54.00 mmol of tert-butyl diazoacetate, 6.00 mmol of octyl diazoacetate, monomer ratio 9:1 (mol). FIG. 5 shows the SEM image of the fiber surface after carbene cografting with the mixing ratio of tert-butyl diazoacetate and octyl diazoacetate monomer as 9:1. It can be seen from (a) and (b) that the thickness of the membranous structure on the fiber surface decreased and the fiber contour became clearer after increasing the amount of tert-butyl diazoacetate. Meanwhile, from the magnified figures (c) and (d), it can be seen that the surface of the polymer membrane began to form micromastoid structures.

Figure 6:
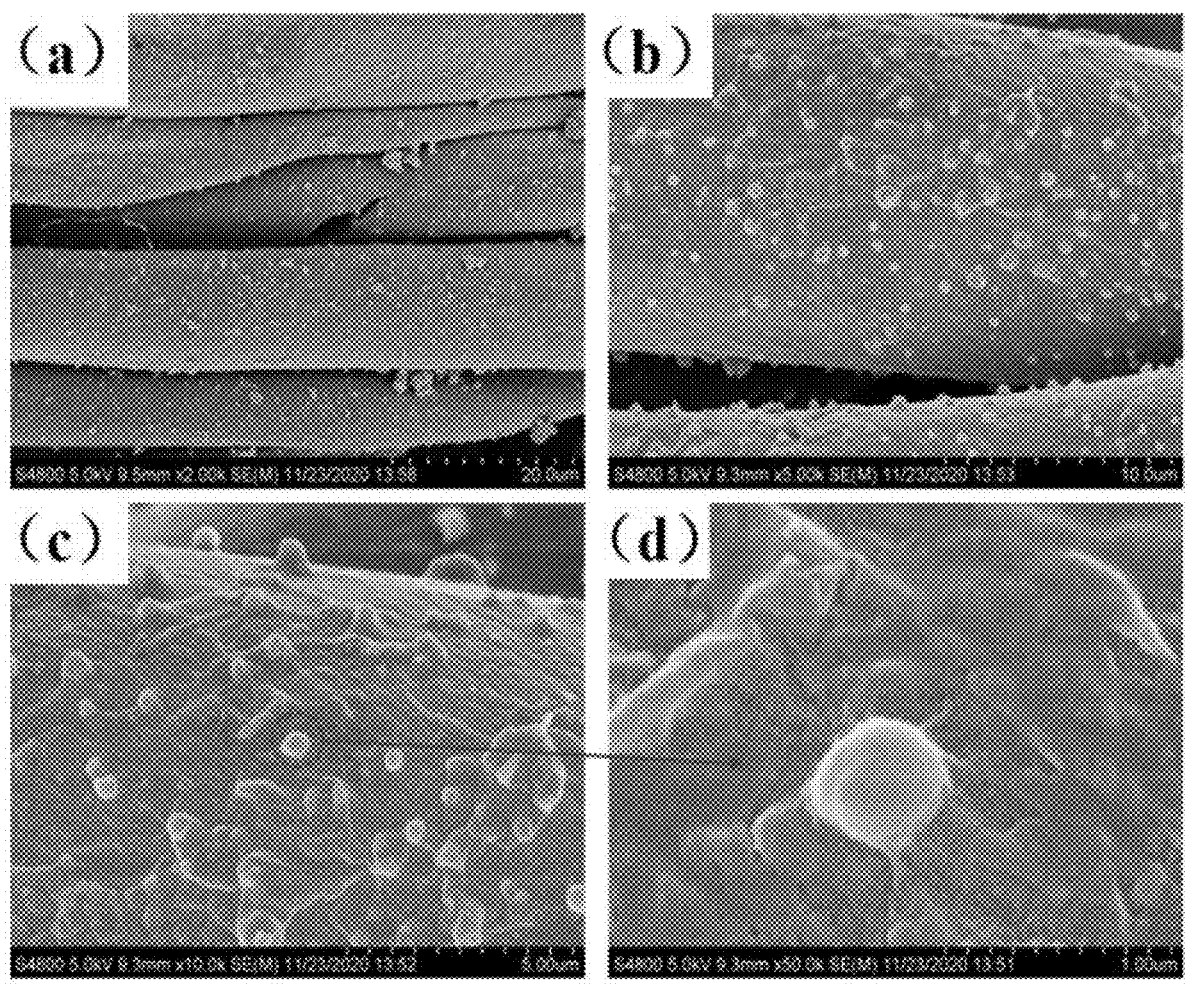
FIG. 6 shows the SEM image of the Copolymer-cotton surface with tert-butyl diazoacetate/octyl diazoacetate 9.5: 0.5: (a)×2000; (b)×5000; (c)×10000; (d)×50000
Figure 7:
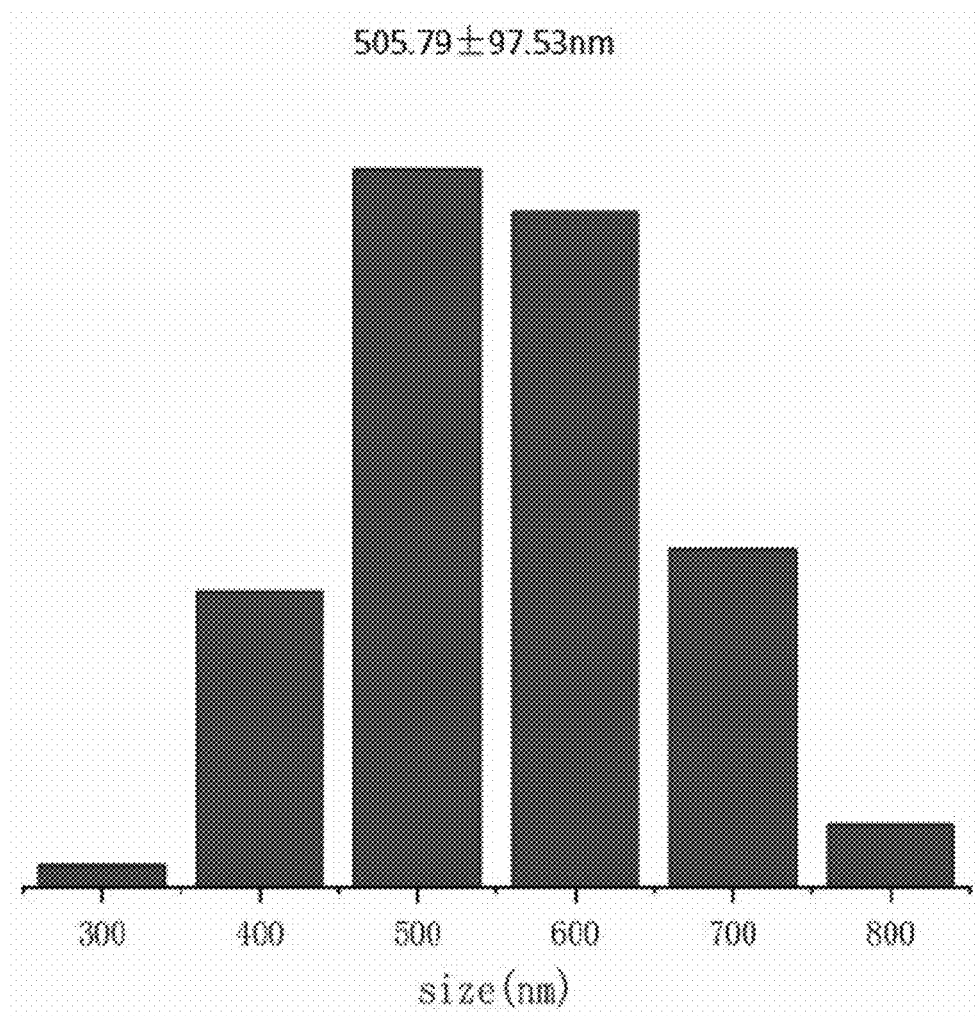
FIG. 7 shows the size distribution of the Copolymer-cotton surface particles with tert-butyl diazoacetate/octyl diazoacetate (9.5:0.5, mol)

(2) 57.00 mmol of tert-butyl diazoacetate, 3.00 mmol of octyl diazoacetate, monomer ratio 19:1 (mol). FIG. 6 shows the SEM image of the fiber surface after carbene cografting with the ratio of tert-butyl diazoacetate monomer and octyl diazoacetate monomer as 19:1. And the fiber surfaces in (a) and (b) were uniformly dispersed with a large number of particulate protrusions with the uniform size. The magnification observation showed that the membranous polymer on the fiber surface in FIGS. 5 (c) and (d) well wrapped the protruding particulate structure, forming a complete composite structure. The particle size of the nano-particles in the figure was statistically analyzed. As shown in FIG. 7, the average particle size was measured to be 505.79±97.53 nm, with a narrow size distribution.

Figure 8:
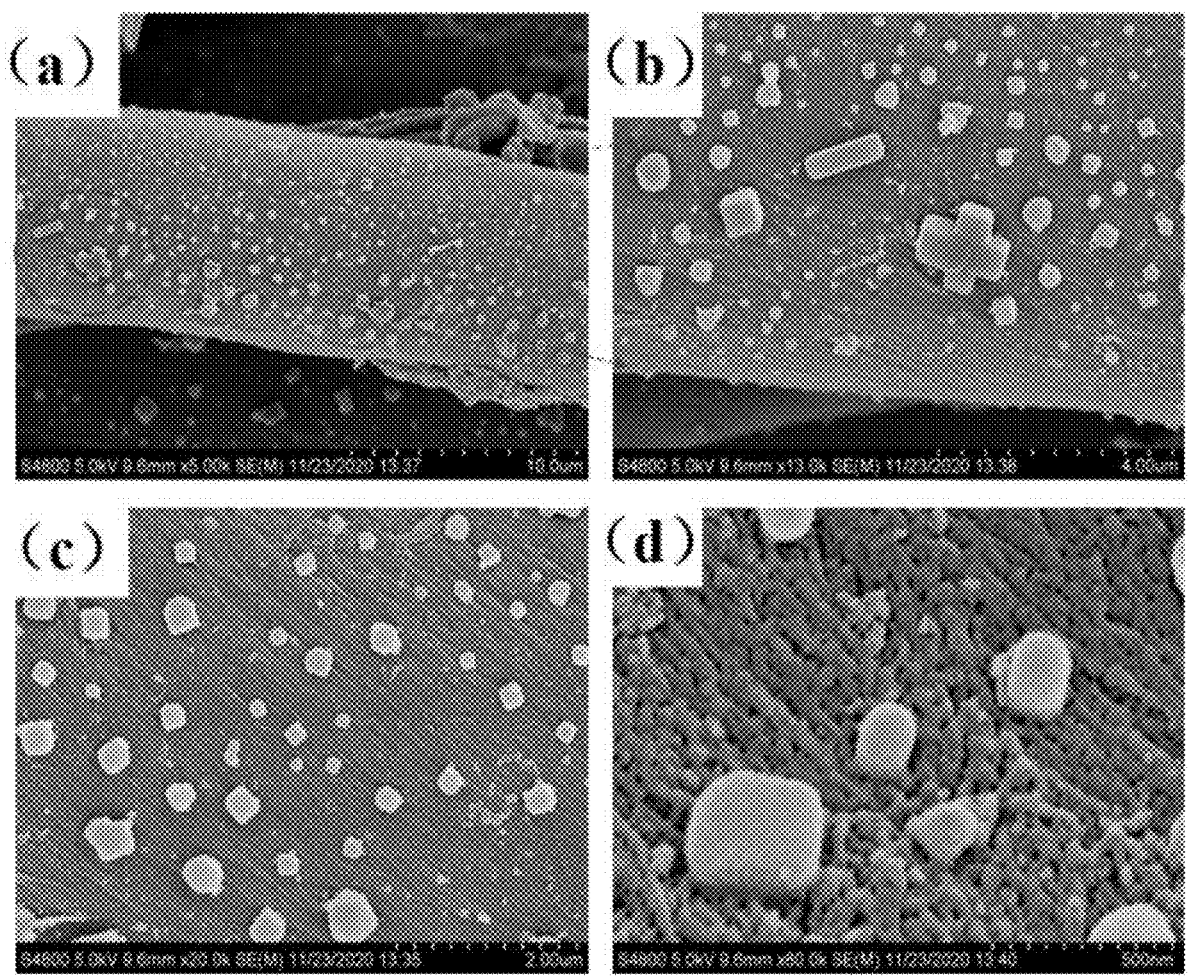
FIG. 8 shows the SEM image of the Copolymer-cotton surface with tert-butyl diazoacetate/octyl diazoacetate 39:1: (a)×5000; (b)×13000; (c)×20000; (d)×80000
Figure 9:
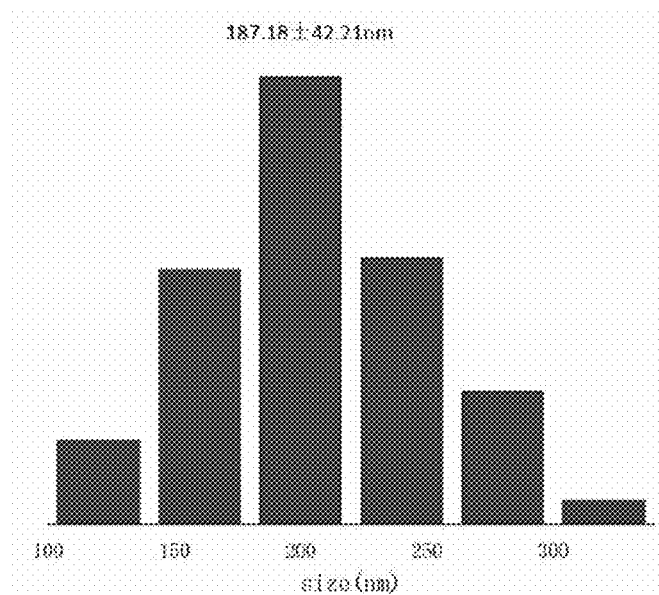
FIG. 9 shows the size distribution of the Copolymer-cotton surface particles with tert-butyl diazoacetate/octyl diazoacetate 39:1

(3) 58.50 mmol of tert-butyl diazoacetate, 1.50 mmol of octyl diazoacetate, monomer ratio 39:1 (mol). FIG. 8 shows the SEM image of the surface of the fabric fiber. It can be seen that the fiber surface in figures (a) and (b) was covered with carbene polymer crystal particles, and the membranous polymer produced by the polymerization of octyl diazoacetate disappeared, while the fiber body was basically exposed. After local magnification, it can be seen from (c) and (d) that the particles on the fiber surface formed a "cubic like" shape, indicating that the polymer crystals generated on the fiber surface at this time were basically tert-butyl diazoacetate carbene polymers. It can be inferred from the fading of the edges and worsening of the regularity of polymer crystal particles that the octyl diazoacetate polymer only covered the surface of the protruding cubic particles at this time. Statistics were conducted on the particle size of crystal particles on the fiber surface, and the results are shown in FIG. 9. The average size of the measured particle structures was 187.18±42.21 nm.

Figure 10:
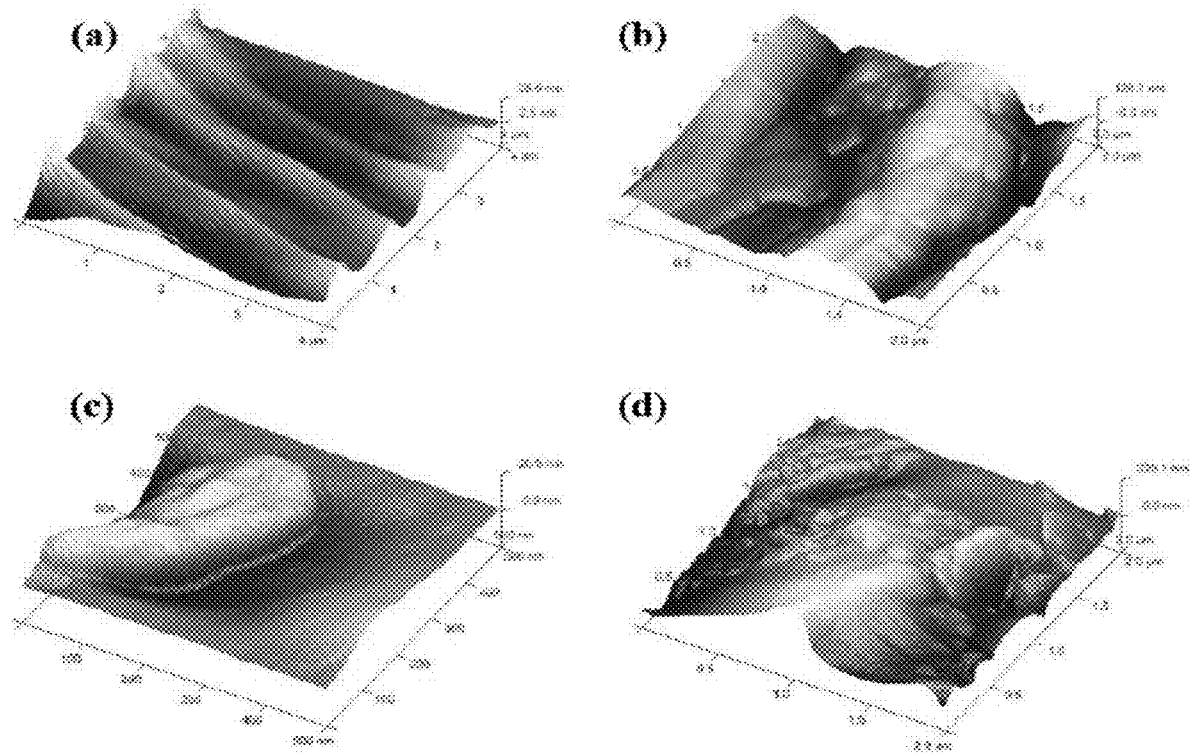
FIG. 10 shows the AFM 3D of the Copolymer-cotton with tert-butyl diazoacetate/octyl diazoacetate 8:2 (a), 9:1 (b), 19:1 (c), and 39:1 (d)

In order to further observe the effect of the ratio of tert-butyl diazoacetate/octyl diazoacetate on the surface morphology of carbene cografted fibers, atomic force microscopy (AFM) was used to analyze the microstructure of cotton fabrics carbene cografted with different ratios to obtain the 3D graphic of surface morphology of modified fabrics (FIG. 10) and the surface roughness test results. In FIG. 10, it can be seen from the 3D graphic of the surface morphology of the fabric after carbene cografting by tert-butyl diazoacetate/octyl diazoacetate in the ratio of 8:2 that the surface of the modified fiber was relatively flat and smooth, with an RMS value of only 13.3 nm; Figures (b), (c) and (d) show the 3D graphics of the surface morphology of the fabric after carbene cografting after lowering the proportion of octyl diazoacetate monomer to 9:1, 19:1, and 39:1, respectively and it can be seen that with the increase of the amount of tert-butyl diazoacetate, the surface roughness structure of the modified fiber gradually became apparent, with RMS values of 22.4 nm, 38.7 nm, and 42.8 nm respectively, and the roughness gradually increased.

Figure 11:
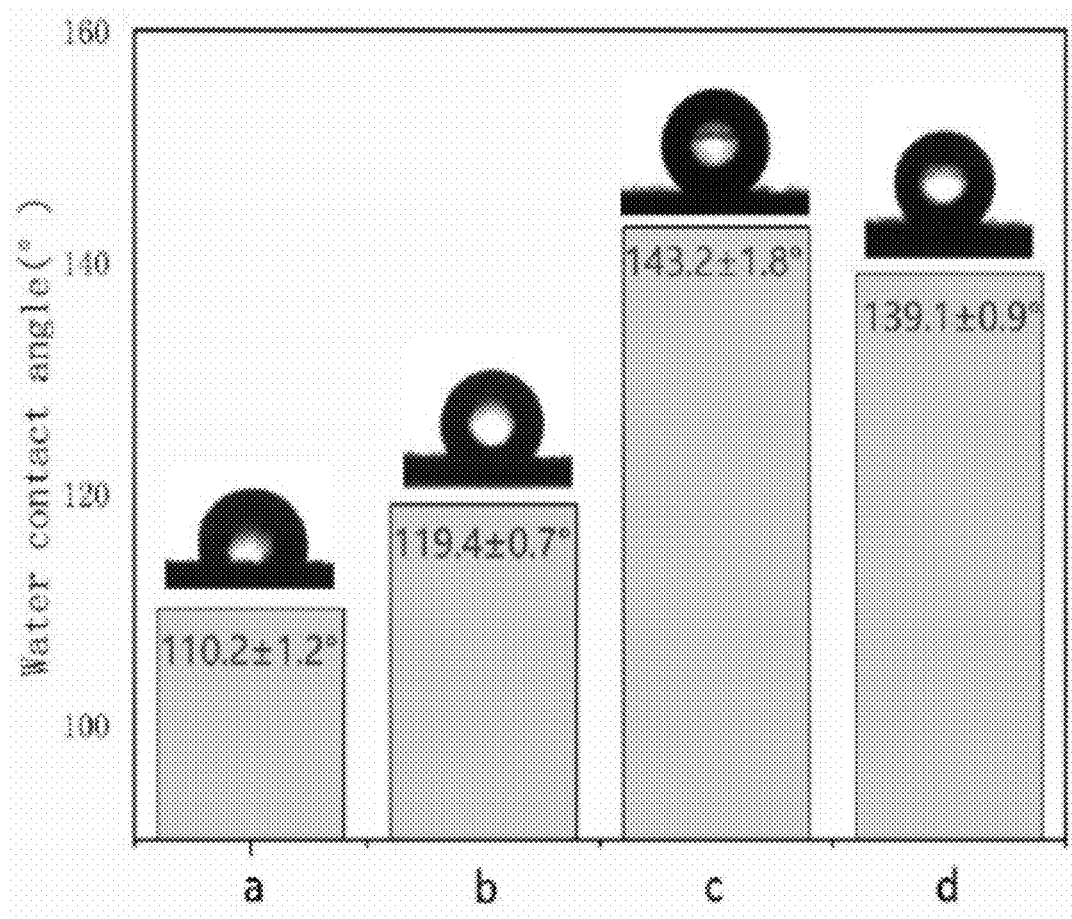
FIG. 11 shows the water contact angles of the Copolymer-cotton with tert-butyl diazoacetate/octyl diazoacetate 8:2 (a), 9:1 (b), 19:1 (c), and 39:1 (d)

FIG. 11 shows the test results of the water contact angle of carbene cografted modified fabrics in different ratios of tert-butyl diazoacetate and octyl diazoacetate. It can be seen that when the amount of tert-butyl diazoacetate gradually increased, the water contact angle of the modified fabric increased from 110.2±1.2° to 143.2±1.8°, significantly higher than that of single carbene grafted modification; however, when the proportion of octyl diazoacetate in the mixed monomer decreased to 2.5%, the hydrophobicity of the cografted modified fabric decreased.

Example 2

Figure 12:
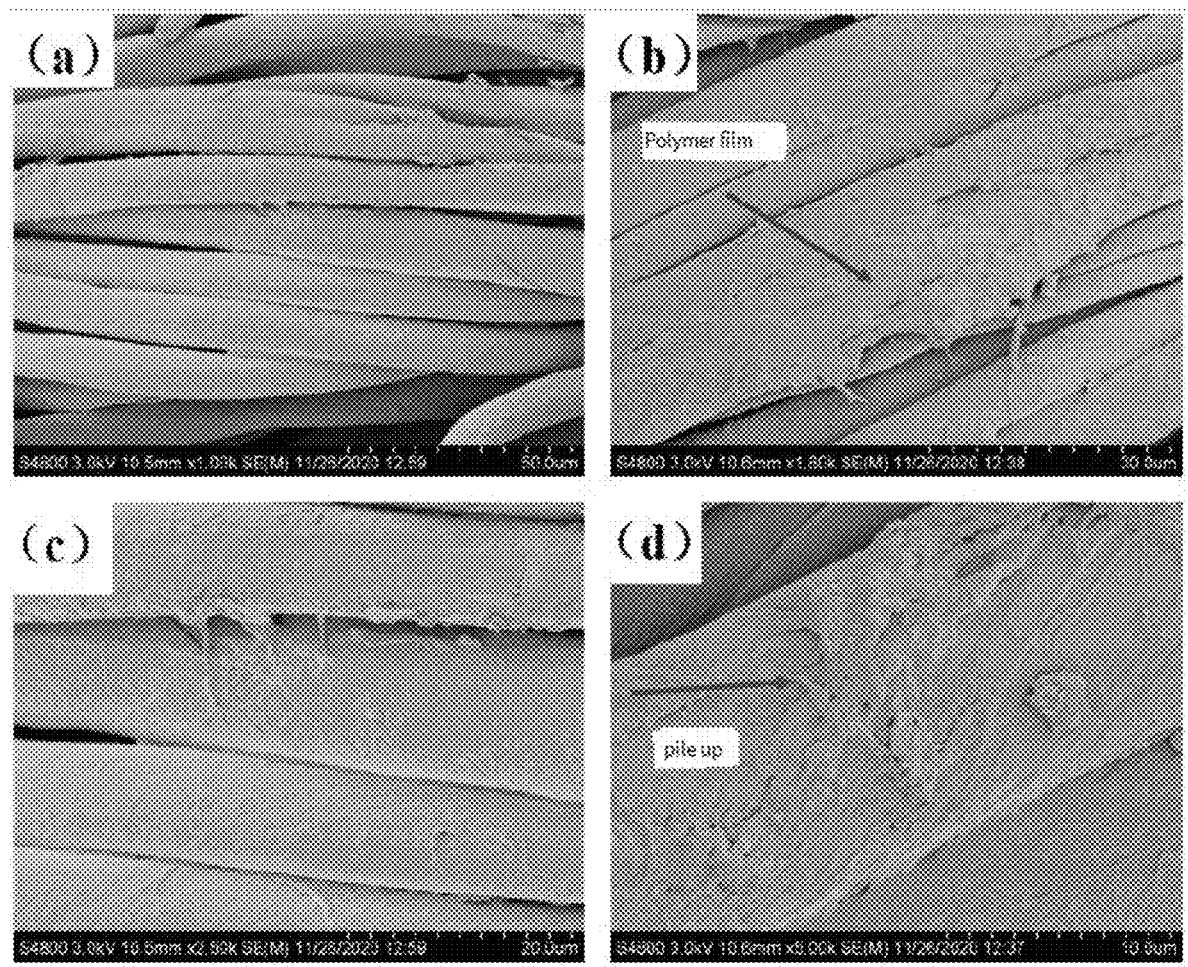
FIG. 12 shows the SEM image of the Copolymer-cotton surface with phenyl diazoacetate/octyl diazoacetate 7:3: (a)×1000; (b)×1800; (c)×2500; (d)×5000

Phenyl diazoacetate/octyl diazoacetate carbene cografting: (1) 18.00 mmol of octyl diazoacetate was taken and dissolved in 50 ml of dehydrated tetrahydrofuran, 4.28 mg (π-allylPdCl)₂ was added in a nitrogen atmosphere at −10° C., and it was heated up to 20° C. to be used in the step (2); (2) 42.00 mmol phenyl diazoacetate monomer was added to 100 ml of dehydrated tetrahydrofuran, and it was shaken evenly until completely dissolved, then it was transferred to a conical flask, and 0.26 g of diazotized cotton fabric was added, and the nitrogen gas was let in to empty the air in the flask; 0.051 mmol (π-allylPdCl)₂ was diluted in 10 ml of dehydrated tetrahydrofuran and added into a conical flask through an injector. After shaking, the solution gradually turned dark and the bubbles generated. The conical flask was transferred into a low-temperature reactor and cooled down to −10° C. After the temperature became stable, NaBPh₄ (0.18 mmol) that was previously dissolved in 10 ml of dehydrated tetrahydrofuran was added dropwise into the conical flask, and bubbles gradually formed inside the conical flask; the reaction temperature was slowly raised to 0° C., 10° C., and 20° C. to react for 1 hour respectively; the solution from step (1) was added to the conical flask filled with phenyl diazoacetate through an injector and mixed evenly, then it was transferred to a shaking water bath, and heated up to 30° C. to react for 24 hours. After the reaction was completed, the fabric was taken out and washed with ethanol and deionized water, and dried in an oven at 50° C. At this time, the ratio of tert-butyl diazoacetate monomer to octyl diazoacetate monomer was 7:3 (mol). FIG. 12 shows the SEM image of the fabric surface after carbene cografting with the ratio of phenyl diazoacetate and octyl diazoacetate as 7:3 (molar ratio, the same below). From FIG. 12 (a), it can be seen that the fiber surface was covered with a layer of polymer membrane. Local magnifications in FIGS. 12 (b), (c), and (d) show that the gaps between the fibers were also filled with carbene polymer, forming a bonding between the fibers.

Figure 13:
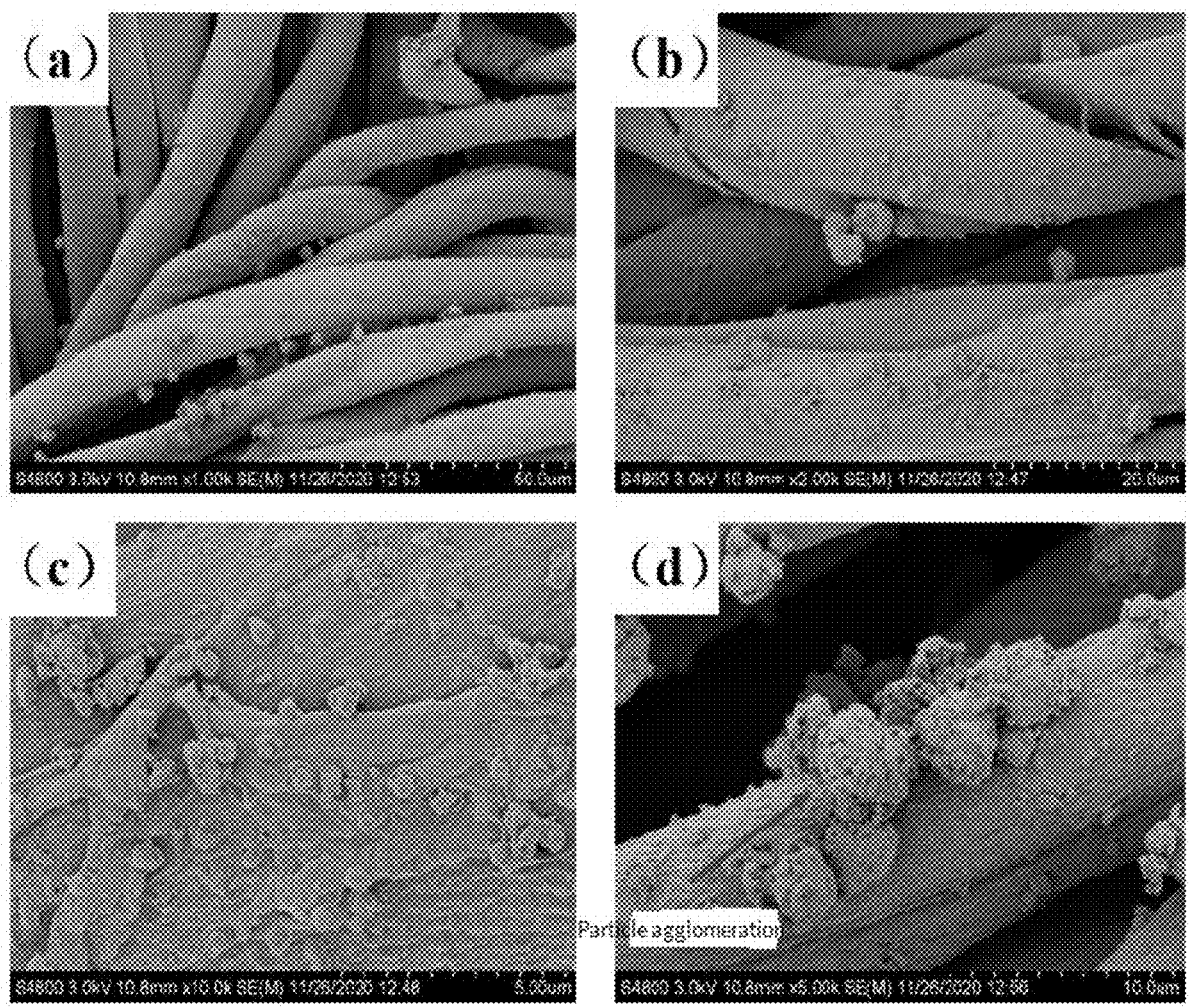
FIG. 13 shows the SEM image of the Copolymer-cotton surface with phenyl diazoacetate/octyl diazoacetate 17:3: (a)×1000; (b)×2000; (c)×10000; (d)×5000
Figure 14:
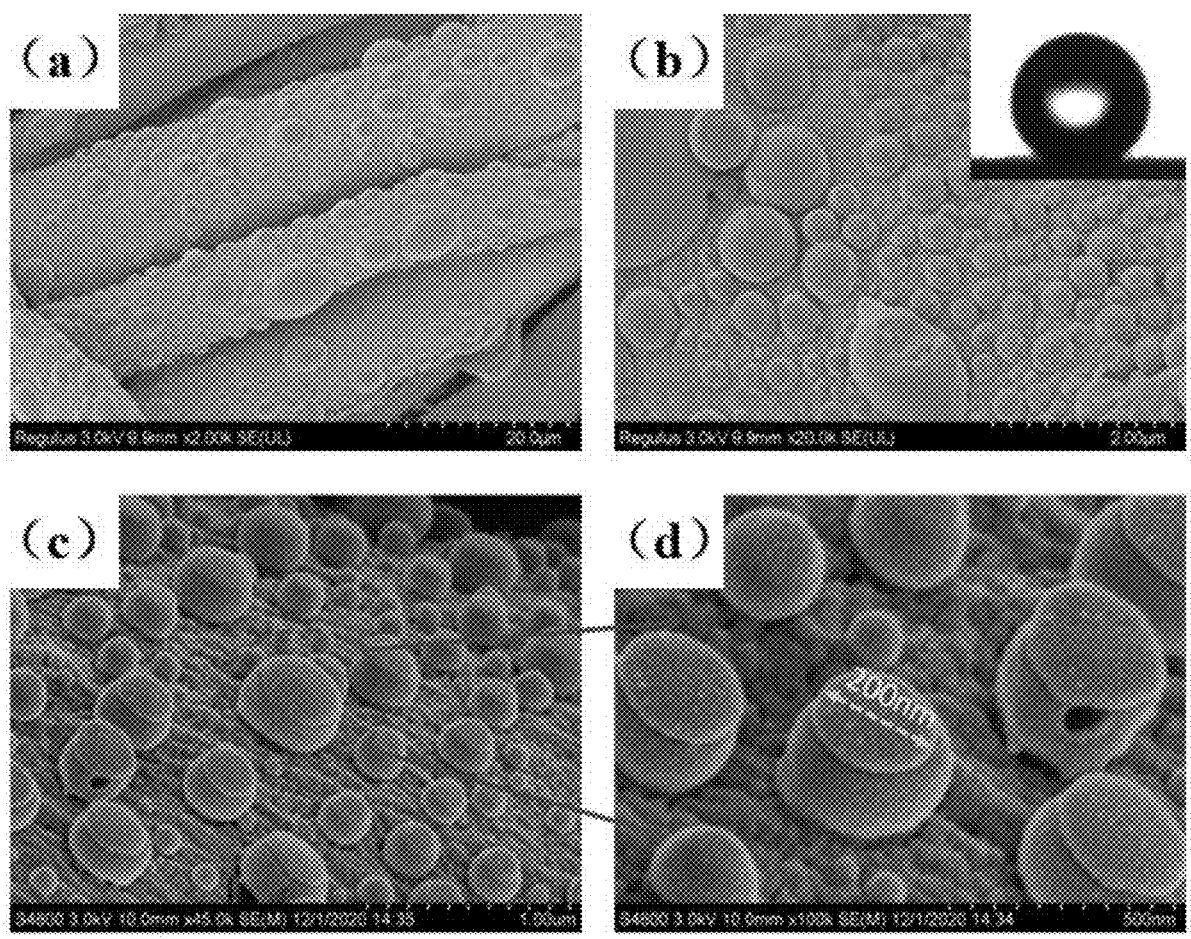
FIG. 14 shows the SEM image of the Copolymer-cotton surface with phenyl diazoacetate/octyl diazoacetate 19:1: (a)×2000; (b)×20000; (c)×45000; (d)×100000
Figure 15:
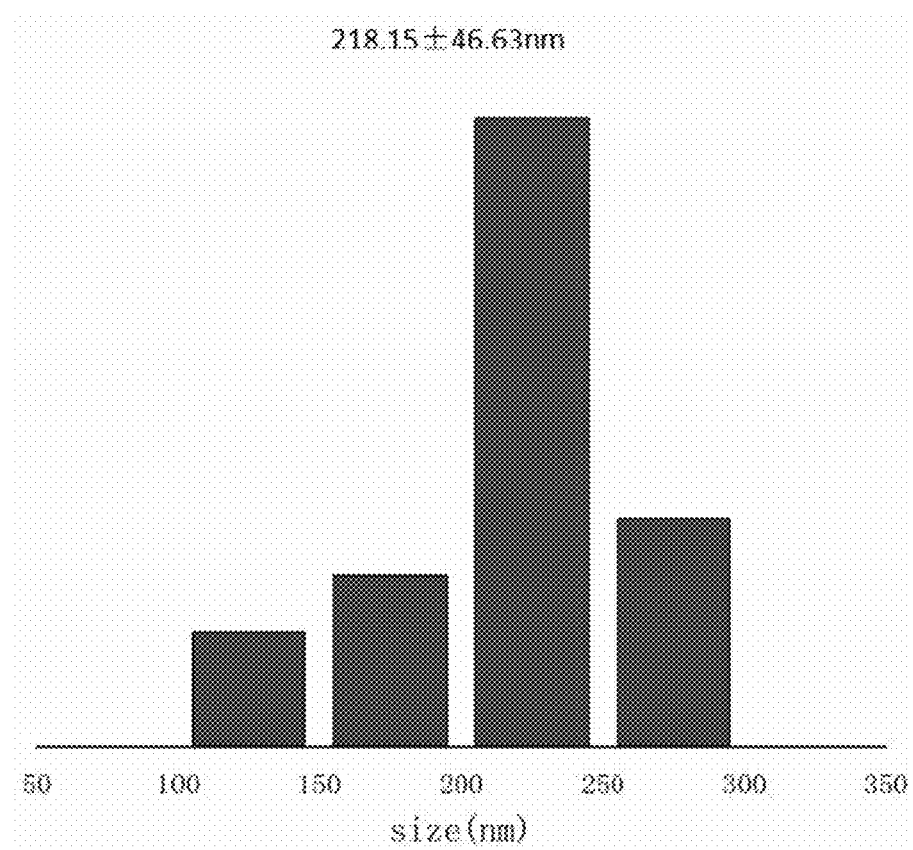
FIG. 15 shows the size distribution of the SEM image of the Copolymer-cotton surface with phenyl diazoacetate/octyl diazoacetate 19:1.

Similarly, in order to explore the effects of two monomer ratios on polymerization, the following two experiments were added. Under the same other process conditions, the dosage of phenyl diazoacetate and octyl diazoacetate was changed to: (1) 8.50 mmol of phenyl diazoacetate, 1.50 mmol of octyl diazoacetate, monomer ratio of phenyl diazoacetate monomer and octyl diazoacetate was 17:3 (mol). FIG. 13 shows the SEM image of the fabric surface after carbene cografting with the ratio of phenyl diazoacetate and octyl diazoacetate as 17:3. In FIG. (a), it can be seen that the surface of the fabric fibers began to generate relatively dispersed micron-sized particles, while the surface was still covered with a thick polymer membrane. The magnification SEM images (b), (c), and (d) show that the size of the polymer particles on the fabric surface was about 500 nm, indicating that when the amount of phenyl diazoacetate monomer increased, the phenyl carbene polymer generated on polymerization on the fiber surface began to be exposed. However, at this time, these nano-sized particles clustered to form larger micron-sized particles, which were formed by polymer membrane bonded nanoparticles. (2) The SEM image of the fabric surface after carbene cografting is shown in FIG. 14, with 9.50 mmol of phenyl diazoacetate and 0.50 mmol of octyl diazoacetate in a ratio of phenyl diazoacetate monomer and octyl diazoacetate monomer at 19:1 (mol). And FIG. 14 (a) shows that when the amount of phenyl diazoacetate increased, complete spherical particles appeared on the surface of the fiber. Unlike the carbene grafting polymerization of the phenyl diazoacetate on the fiber surface alone, FIGS. 14 (b), (c), and (d) further shows that the surface of these microsphere particles was covered with a membranous substance. It's believed through analysis that phenyl diazoacetate first polymerized and crystallized on the fiber surface to form spherical particles, and then a small amount of octyl diazoacetate continued to undergo carbene polymerization on the surface of the spherical particles, ultimately forming a composite morphology of polymer membrane wrapping spherical particles as shown in the figure. This morphology combined the advantages of low surface energy chemical composition and "roughening" physical structure. The particle size of the microspheres in the figure was statistically analyzed (FIG. 15), and the average diameter was 218.15±46.63 nm. At this time, the WCA of the grafted modified cotton fabric reached 151.2±0.8°, and the fabric was superhydrophobic, significantly better than the above two ratios, and also significantly higher than that of single carbene grafting modification.

Figure 16:
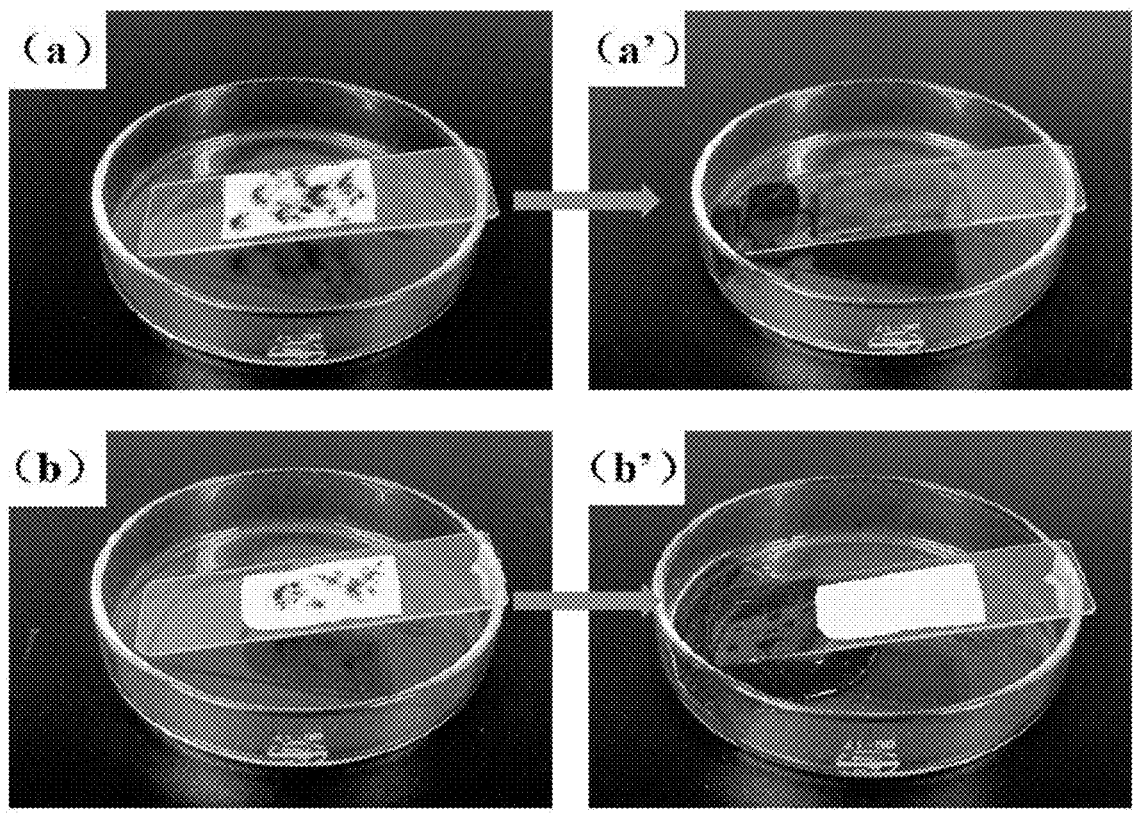
FIG. 16 shows the self-cleaning tests of raw cotton (a, a') and Copolymer-cotton (b, b') with phenyl diazoacetate/octyl diazoacetate 19:1.

A comparative test was conducted on the self-cleaning performance of cotton fabric after carbene cografting with phenyl diazoacetate/octyl diazoacetate (19:1, molar ratio). The results are shown in FIG. 16. FIG. 16 (a) shows untreated cotton fabric. It can be seen that when water droplets flew through the raw cotton fabric from top to bottom, dirt still adhered to the surface of the fabric and contaminated the entire fabric surface; After grafting modification, cotton fabric showed good self-cleaning ability due to its excellent superhydrophobicity to make water droplets flow through the surface of the fabric while taking away surface dirt.

The invention claimed is:

1. A carbene grafted modified fabric, wherein the carbene grafted modified fabric is obtained by sequentially reacting a diazotized cotton fabric first with one selected from the group consisting of tert-butyl diazoacetate and phenyl diazoacetate and then with octyl diazoacetate; and
   wherein a fluorine-containing reagent is not used to prepare the carbene grafted modified fabric.

2. The carbene grafted modified fabric according to claim 1, wherein a cotton fabric is sequentially soaked in alkaline solution and acid solution to obtain a pre-treated cotton fabric; then, the pre-treated cotton fabric is reacted with bromoacetyl bromide to obtain a treated cotton fabric; the treated cotton fabric is reacted with 1,2-bis (p-Toluenesulfonyl) hydrazine to obtain the diazotized cotton fabric.

3. The carbene grafted modified fabric according to claim 1, wherein the molar ratio of tert-butyl diazoacetate to octyl diazoacetate is (4-40):1; a molar ratio of phenyl diazoacetate to octyl diazoacetate is (2-30):1.

4. The carbene grafted modified fabric according to claim 3, wherein the molar ratio of tert-butyl diazoacetate to octyl diazoacetate is (9-30):1; the molar ratio of phenyl diazoacetate to octyl diazoacetate is (5-25):1.

5. The carbene grafted modified fabric according to claim 1, wherein the diazotized cotton fabric is first reacted with tert-butyl diazoacetate at 0° C., 10° C., and 20° C. for 1 hour respectively, and then the octyl diazoacetate is added for reaction for 20-30 hours at 30° C.; alternatively, the diazotized cotton fabric is reacted with phenyl diazoacetate at 0° C., 10° C., and 20° C. for 1 hour, respectively, and then the octyl diazoacetate is added for reaction for 20-30 hours at 30° C.

* * * * *